United States Patent [19]

Vallvey et al.

[11] Patent Number: 4,832,749

[45] Date of Patent: May 23, 1989

[54] PIGMENT COMPOSITION

[75] Inventors: Juan A. Vallvey; Carlos M. Solé, both of Barcelona, Spain

[73] Assignee: Colores Hispania, S.A., Barcelona, Spain

[21] Appl. No.: 135,203

[22] Filed: Dec. 21, 1987

[30] Foreign Application Priority Data

Dec. 19, 1986 [ES] Spain .................................. 8603511

[51] Int. Cl.$^4$ ............................................ C09C 1/08
[52] U.S. Cl. .................................. 106/419; 106/433; 106/453
[58] Field of Search ............... 106/308 F, 308 B, 298, 106/292, 302, 419, 433, 453

[56] References Cited

PUBLICATIONS

*Chemical Abstracts*, vol. 73, No. 8, Mar. 14, 1970, Abstract No. 36662p, Tsuru et al, "Water Soluble Corrosion Protecting Paints".

*Primary Examiner*—Amelia Burgess Yarbrough
*Attorney, Agent, or Firm*—Sughrue, Mion, Zinn, Macpeak & Seas

[57] ABSTRACT

A pigment composition, particularly adapted for the coloring of plastics materials, consisting of pigments comprising lead chromate, lead sulfochromate, lead molyb-do-sulfochromate, zinc chromate or strontium chromate and being covered by a film formed by an ester of an aromatic or aliphatic tricarboxylic acid and an aliphatic alcohol; the composition is remarkably stable at high temperature and improves the viscosity conditions of the semi-molten mass formed by the composition plus the polymer to be colored.

4 Claims, No Drawings

PIGMENT COMPOSITION

BACKGROUND OF THE INVENTION

1. Field of the Invention

The invention relates to a pigment composition, particularly suitable for colouring plastics materials.

2. State of the Art

It is known in the art to use the intermediate procress of colour concentrates (master batch) for colouring plastics materials. In this process, a resin mass containing 50 to 60% pigment is prepared. During the process, the pigment and resin are subjected to high temperature and high shear forces until the pigment is completely homogenised in the polymer mass. It is desirable for the pigments used to withstand these conditions and, moreover, when the master batch obtained is used to colour the final polymer and is reprocessed by injection or extrusion to provide an object, for them to continue maintaining their heat resistance so as not to lose their good properties of light fastness, weather strength and resistance to other aggressive atmospheric agents once incorporated in the object.

SUMMARY OF THE INVENTION

An objective of the invention is to prepare a pigment composition which wets well with the semi-molten resin and that the flow properties it confers on the mass should be such as not to need an excessively intense mechanical action for the dispersion thereof. The term "to wet" is used herein in the broadest sense, i.e. it relates to liquids in general and not to water in particular.

It has been found that the addition of aromatic or aliphatic triacid esters, wherein the starting alcohols are aliphatic, to a pigment prepared to withstand high temperatures or also to a conventional pigment, under conditions ensuring an even distribution of these esters over the pigment particle surfaces, provides compositions or products having an improved wettability reducing the viscosity of the semi-molten polymer-plus-pigment mass, as well as an increase of the heat resistance. It is desirable for these esters to have a high melting and boiling point, as also a good heat stability, since they will be subjected with the pigment to the plastics processing temperatures.

The pigment composition according to the invention may be prepared by a process in which an aqueous suspension is formed of pigments comprising lead chromate, lead sulfochromate, lead molybdo-sulfochromate, zinc chromate or strontioum chromate, for subsequent treatment with an ester of an aromatic or aliphatic tricarboxylic acid and an aliphatic alcohol previously finely emulsified in water by mechanical means, said ester content ranging from 3 to 24% by weight of the pigment.

Preferably according to the invention, an already stabilised pigment, in aqueous suspension, before drying, free from soluble salts, is heated to a temperature ranging from 50° C. to 95° C. and treated with a previously prepared emulsion of a tricarboxylic acid alkyd ester. The mixture is decanted, filtered and washed to remove again any soluble salts, such that the conductivity of the solution is below 90 μS. The ester emulsion is prepared by mechanical means, without any surfactant addition, to avoid compounds which may thermally sensitise the pigment.

The pigment composition of the invention is characterised in that it consists of pigments comprising lead chromate, lead sulfochromate, lead molybdo-sulfochromate, zinc chromate or strontium chromate and which are covered by a generally even film formed by an ester of an aromatic or aliphatic tricarboxylic acid and an aliphatic alcohol.

Preferably according to the invention, said ester is octyl trimellitate, of the formula

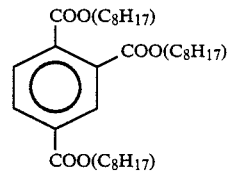

or an alkyl citrate, more particularly, ethyl citrate of the formula

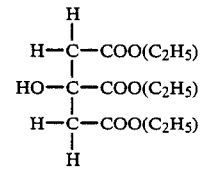

The properties of the pigment composition thus obtained may be checked in the sigma blade laboratory or industrial mixer, generally known as a Bambury mixer. It is not necessary to subject the machine to such high effort to homogenise the mixture of the pigment composition and the polymer, even in polypropylene media having a flow index of 5.8. This is seen because the appearance of the mass when it solidifies is not so short, has smoother profiles; it is also easier to clean the blades and the mixing bowl such that to a certain extent the machine cleans itself during the emptying operation. Substantially less dust is also seen to be formed when charging the machine. In subsequent processing by injection, the heat resistance is seen to be improved by 10° to 15° C. more. In other words, the green tone taken on by reduction of the chromate to a chromic salt is delayed to about 295° to 300° C., for a heat stabilised pigment.

Furthermore, with the treatment of the invention, the hydrophilic pigment surface has become hydrophobic and this leads to easier wetting (as far as fluids other than water are concerned) and easier dispersion in the polymeric medium and, therefore, also less harsh treatment of the pigment's protective coating, providing thereby greater resistance (to heat, light, etc) in the injected product.

The greater affinity, relative to a conventional pigment, of the pigment composition according to the invention, with the polymer means that it strips more easily from the metal surface of the mixer. A certain degree of agglutination of the particles should also be assumed to take place, forming labile cumuli of a size in excess of 20 microns, which reduces the formation of dust during handling.

The process of the invention may be applied, as stated above, to conventional or slightly stabilised pigments either fundamentally of the lead, zinc or strontium chromate type, in neutral or basic salt form (in which notable improvements, both in wettability, heat resistance, etc. may be obtained) or to those which, because of their stability, are already heat resistant, but on the other hand have their handling qualities much improved (making less dust), wetting (are better incorporated in the resin mass) and behaviour in the sigma blade mixer, without loss of properties in the subsequent injected object.

Certain examples are given below which illustrate the invention without limiting it.

EXAMPLE 1A

Conventionally Stabilised Lemon Yellow 421 g of lead nitrate diluted to 3,500 cc were placed in a 10 liter laboratory reactor.

114 g of sodium chromate dihydrate, 36 g of sodium hydroxide, 38.5 g of sodium sulfate were weighed out and diluted to 3,500 cc.

The latter solution was poured over the one in the reactor with stirring for 25 minutes. The mother liquors have an excess of lead ion.

The mixture was allowed to stand without mixing for 2 days and sodium sulfochromate (in the same molar ratio to the precipitation formula) up to a lead excess of 1.5 g/l was added.

The mixture was allowed to stand again without mixing for two days after which further sodium sulfochromate was added until the lead excess was practically zero.

Thereby 397 g of precipitate were obtained. These were stabilised by adding 4.3 g of titanium dioxide (as titanyl sulfate solution), precipitated as hydroxide, to the pigment paste.

Thereafter 3.7 g of ceric oxide (as ceric nitrate solution) were added.

The mixture was stirred for a further 5 minutes and was neutralised to pH 5 with sodium carbonate solution.

Thereafter 11 g of aluminium oxide (as hydrated aluminium sulfate) followed by 3.6 g of silicic anhydride (as sodium silicate solution) were added.

The mixture was stirred for a further 5 minutes and was neutralised to pH 7 with sodium carbonate solution.

It was filtered, washed until all soluble salts were removed. It was dried at 100° C. and thereafter ground with a suitable laboratory mill.

Heat Resistance Test

A master batch was prepared in a Bambury type double sigma laboratory mixer, by dispersing 60% low density, high fluidity polythene resin (LDPE) and 40% test pigment until total homogenisation was achieved.

The mixture was then ground in a Waring blender.

Colourless polypropylene pellets having a flow index of 35 dg/min were taken and were pigmented with the master batch obtained, up to a pigment content of 2%.

This mixture was homogenised and two 50×50 mm square test pieces were injected in an automatic injection machine, one at a temperature of 190° C. and the other at 300° C.

The $\Delta E$ across the two test pieces was measured with an ACS (Applied Colour System) Spectro Sensor II, giving a result of $\Delta E_{(300°-190°)}=60.96$. The $\Delta E$ was calculated using the CIE Lab. 1976 formula.

The illumination used was D65.

EXAMPLE 1B

Lemon Yellow Stabilised Conventionally and Treated According to the Invention Example 1A was folloed exactly but when filtering, the product was washed with distilled water until the wash liquors had a conductivity below 90 microsiemens.

Sufficient distilled water was added to this normal stabilised pigment cake to give 50% solids.

The mixture was heated to 85° C.

A dispersion of 68 g of octyl trimellitate (OTM) in 300 cc of distilled water was prepared at 60° C., stirring with a high speed laboratory stirrer (15,000 rpm) for 5 minutes, giving a stable dispersion. This dispersion was added over a period of 10 minutes to the 50% solids pigment cake heated to 85° C.

The mixture was stirred for a further 30 minutes.

It was dried as it was (since there are practically no soluble salts) at 100° C. It was ground in a suitable laboratory mill.

The heat resistance was tested as in Example 1A, giving a result of $\Delta E_{(300°-190°)}=35.69$.

A comparison of the results of the heat resistance tests performed on the products of Examples 1A and 1B showed a much smaller colour variation for the Example 1B product. It was also shown that test product 1B allows handling with much less dust formation and a speedier and easier dispersion and cleanliness in the Bambury.

EXAMPLE 2A

Conventional Medium Yellow 689 g of lead nitrate diluted to 3,000 cc were placed in a 10 liter laboratory reactor.

300 g of sodium dichromate dihydrate and 84.6 g of sodium hydroxide were weighed out and diluted to 3,000 cc.

This latter solution was poured over the one in the reactor, under stirring, over a period of 60 minutes. The mother liquors had a 1 g/l excess of sodium dichromate and the pH was 8.5.

The mixture was heated under stirring at 90° C. for 1 hour.

The mixture was allowed to stand, without stirring, for 2 days. The mother liquors were siphoned off and replaced up to the same volume whereby the excess chromate ion was considerably reduced. In spite of this, the necessary lead ion was added until the mother liquors had a slight excess of this latter.

In this way, 661 g of medium yellow precipitate were obtained and this was stabilised using a conventional process.

9.7 g of titanium dioxide (as titanyl sulfate solution) were added to the pigment paste under stirring. Thereafter, 4.6 g of ceric oxide (as ceric nitrite) were added.

The mixture was stirred for a further 5 minutes and neutralised to pH=5, with a sodium carbonate solution.

Therafter 18.6 g of aluminum oxide (as hydrated aluminium sulfate) were added, followed by 7.1 g of silicic anhydride (as sodium silicate).

The mixture was stirred for a further 5 minutes and was neutralised with sodium carbonate solution to pH=7.0.

The mixture was filtered, washed to complete elimination of soluble salts, leaving a precipitate which was split in to two equal portions.

One of said portions was filtered, dried, ground and the heat resistance test described in Example 1A was carried out, the test temperatures being 190° C. and 280° C. in this case. The result obtained was $\Delta E_{(280°-190°)} = 54.51$.

EXAMPLE 2B

Conventional Medium Yellow Treated According to the Invention

The other half portion of the precipitate obtained in Example 2A was treated with OTM at the same rate as described in Example 1B and thereafter the heat resistance test as described in Example 1A was carried out, the test temperatures being also 190° C. and 280° C. in this case. The result obtained was $\Delta E_{(280°-190°)} = 40.60$. Once again the fact that with the sample of Example 2B a more heat stable colour is obtained, further to the handling advantages was observed.

EXAMPLE 3A

Conventional Molybdenum Orange 235 g of lead nitrate were dissolved in 3,000 cc of water.

Also, 85 g of sodium dichromate dihydrate, 12.5 g of sodium molybdate, 5.4 g of sodium sulfate, 21.1 g of sodium hydroxide and 26 g of potassium chloride were diluted in 3,000 cc and the pH was centered around 10.

Both solutions were poured simultaneously into a 10 l tapering cylindrical reactor, with vigorous stirring for 5 minutes, but in such a way that the mother liquors always had an excess of 1 g/l lead ion and a pH of 3.5.

The mixture was stirred for 30 minutes, after which sufficient sodium molybdo-sulfochromate (in the same mole ratio as in the precipitation formula) was added for the excess lead ion in the mother liquors to be reduced practically to zero.

In this way, 229 g of precipitate prepared for stabilisation with a conventional process were obtained.

0.7 g of antimony oxide (as antimony trichloride solution) was added with stirring to the pigment paste. Thereafter 1,5 g of titanium dioxide (as titanyl sulfate solution) were added. Then 1.5 g of ceric oxide (as ceric nitrate) were added.

The mixture was stirred for a further 5 minutes and was neutralised to pH=5 with a sodium carbonate solution.

Thereafter 3.1 g of aluminium oxide (as hydrated aluminium sulfate) were added, followed by 1.4 g of silicic anhydride (as sodium silicate solution). The mixture was stirred for 2 minutes and 3.5 g of industrial trisodium phosphate were added. The mixture was stirred for a further 2 minutes and was neutralised to pH=7.0 with 40 g/l sodium hydroxide.

The mixture was filtered, washed to complete elimination of soluble salts, leaving a precipitate which was split into two equal portions.

One of these portions was filtered, dried at 80° C., ground and subjected to the heat resistance test described in Example 1A, the test temperatures being 200° C. and 280° C. in this case. The result obtained was $\Delta E_{(280°-200°)} = 28.03$

EXAMPLE 3B

Conventional Molybdenum Orange Treated According to the Invention

The other half portion of the precipitate of Example 3A was treated with OTM at the same rate as described in Example 1B and thereafter the heat resistance test described in Example 1A was carried out, the test temperatures also being 200° C. and 280° C. in this case. The result obtained was $\Delta E_{(280°-200°)} = 14.54$.

EXAMPLE 4A

Heat Resistant Medium Chrome Yellow 689 g of lead nitrate diluted in 3,000 cc were placed in a 10 liter laboratory reactor.

300 g of sodium dichromate dihydrate and 84.6 g of sodium hydroxide were weighed out and diluted to 3,000 cc.

This latter solution was poured over the one in the reactor, under stirring, over a period of 60 minutes. The mother liquors had a 1 g/l excess of sodium dichromate and the pH was 8.5.

The mixture was heated under stirring at 90° C. for 1 hour.

The mixture was allowed to stand, without stirring, for 2 days. The mother liquors were siphoned off and replaced up to the same volume whereby the excess chromate ion was considerably reduced. In spite of this, the necessary lead ion was added until the mother liquors had a slight excess of this latter.

In this way, 661 g of medium yellow precipitate were obtained and this was stabilised by adding 33.2 g of sodium silicate containing 28% $SiO_2$, diluted to 190 cc, over the well stirred pigment paste, the pH being centered about 9. Thereafter 70 g of ammonium sulfate diluted to 350 cc was added over 1 hour.

The mixture was heated to 70° C., 40 g of sodium silicate containing 28% $SiO_2$, diluted to 300 cc, were added slowly over the well stirred pigment paste, the pH being centered about 9. Thereafter 115 g of ammonium sulfate diluted to 600 cc were added over 1 hour.

27.9 g of $Sb_2O_5$ (in soluble form, obtained by a balanced mixture of chlorides and fluorides) were added over 30 minutes, the pH being held always between 5 and 9.

43.4 g of $Sb_2O_3$ (in soluble form, obtained by a balanced mixture of chlorides and fluorides) were added over 30 minutes, the pH being held to between 5 and 9. At the end of the operation, the pH was centered about 7.

Thereafter there were precipitated in situ 62 g of a mixture of zinc phosphate and zinc hexametaphosphate (1:1) adding the component ions slowly over a period of 1 hour and holding the pH to between 5 and 9. Finally the pH was centered about 7, the mixture was filtered and washed to complete removal of the soluble salts.

The thus treated pigment is of the medium yellow type, having good resistance to chemical agents, weathering and heat. Once again the sample was divided into two equal portions. One of them was filtered, washed and dried in the usual way. Thereafter, the heat resistance test described in Example 1A was carried out, the test temperatures being 300° C. and 190° C. The result obtained was $\Delta E_{(300°-190°)} = 11.47$

EXAMPLE 4B

Heat Resistant Medium Chrome Yellow Treated According to /the Invention

The other half portion of the precipitate obtained from Example 4A was treated with OTM at the same rate as described in Example 1B and thereafter the sample was subjected to the heat resistance test described in Example 1A, the test temperatures in this case being also 190° C. and 300° C. The result obtained was $\Delta E_{(300°-190°)}=6.69$ Apart from the handling and dispersion advantages obtained, the colour variation is seen to be less in the pigment composition according to the invention than in a corresponding pigment not having been subjected to the treatment described.

EXAMPLE 5A

Heat Resistant Medium Chrome Yellow 689 g of lead nitrate diluted in 3,000 cc were placed in a 10 liter laboratory reactor. 300 g of sodium dichromate dihydrate and 84.6 g of sodium hydroxide were weighed out and diluted to 3,000 cc.

This latter solution was poured over the one in the reactor, under stirring, over a period of 60 minutes. The mother liquors had a 1 g/l excess of sodium dichromate and the pH was 8.5.

The mixture was heated under stirring at 90° C. for 1 hour.

The mixture was allowed to stand, without stirring, for 2 days. The mother liquors were siphoned off and replaced up to the same volume whereby the excess chromate ion was considerably reduced. In spite of this, the necessary lead ion was added until the mother liquors had a slight excess of this latter.

In this way, 661 g of medium yellow precipitate were obtained and this was stabilised by adding 33.2 g of sodium silicate containing 28% $SiO_2$, diluted to 190 cc, over the well stirred pigment paste, the pH being centered about 9. Therafter 70 g of ammonium sulfate diluted to 350 cc was added over 1 hour.

The mixture was heated to 70° C., 40 g of sodium silicate containing 28% $SiO_2$, diluted to 300 cc, were added slowly over the well stirred pigment paste, the pH being centered about 9. Thereafter 115 g of ammonium sulfate diluted to 600 cc were added over 1 hour.

27.9 g of $Sb_2O_5$ (in soluble form, obtained by a balanced mixture of chlorides and fluorides) were added over 30 minutes, the pH being held always between 5 and 9.

43.4 g of $Sb_2O_3$ (in soluble form, obtained by a balanced mixture of chlorides and fluorides) were added over 30 minutes, the pH being held to between 5 to 9. At the end of the operation, the pH was centered about 7.

Thereafter there were precipitated in situ 62 g of a mixture of zinc phosphate and zinc hexametaphosphate (1:1) adding the component ions slowly over a period of 1 hour and holding the pH to between 5 and 9. Finally the pH was centered about 7, the mixture was filtered and washed to complete removal of the soluble salts.

The thus treated pigment is of the medium yellow type, having good resistance to chemical agents, weathering and heat. Once again the pigment was divided into two equal portions, one of them (Example 5A) was filtered, washed and dried in the usual way.

Thereafter, the heat resistance test described in Example 1A was carried out, the test temperatures being 190° C. and 300° C. The result obtained was $\Delta E_{(300°-190°)}=11.47$

EXAMPLE 5B

Heat Resistant Medium Chrome Yellow Treated According to the Invention

The other half portion of the precipitate of Example 5A was treated at the same rate and according to the system described in Example 1B, but with ethyl citrate and thereafter was subjected to the heat resistance test described in Example 1A, the test temperatures in this case also being 190° C. and 300° C. The result obtained was $\Delta E_{(300°-190°)}=6.72$ Apart from the handling and dispersion advantages, the colour variation is seen to be less in the pigment composition of the invention than in a corresponding untreated pigment.

What we claim is:

1. A pigment composition, particularly adapted for the colouring of plastics materials, consisting of one or more pigments selected from the group consisting of lead chromate, lead sulfochromate, lead molybdo-sulfochromate, zinc chromate, said pigments or strontium chromate, and being covered by a generally uniform film formed by an ester of an aromatic or aliphatic tricarboxylic acid and an aliphatic alcohol.

2. The pigment composition of claim 1, wherein said ester is octyl trimellitate having the formula

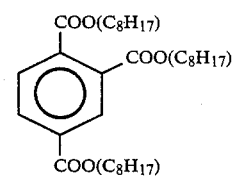

3. The pigment composition of claim 1, said ester being ethyl citrate having the formula

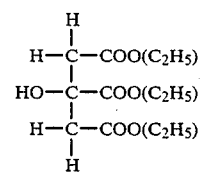

4. The pigment composition of claim 1, wherein said ester is included in an amount of between 3 and 24% by weight of the pigment.

* * * * *